United States Patent [19]

Oppenheimer

[11] Patent Number: 4,917,448
[45] Date of Patent: Apr. 17, 1990

[54] LIGHTED DISPLAY DEVICE

[76] Inventor: M. David Oppenheimer, 8433 Edwin Dr., Los Angeles, Calif. 90046

[21] Appl. No.: 263,086

[22] Filed: Oct. 27, 1988

[51] Int. Cl.$^4$ .................................................. C02B 6/00
[52] U.S. Cl. .................................. 350/96.1; 350/96.25; 350/96.2; 362/32
[58] Field of Search ................... 350/96.2, 96.1, 96.15, 350/96.24, 96.25; 362/32

[56] References Cited

U.S. PATENT DOCUMENTS

| | | | |
|---|---|---|---|
| 2,639,528 | 5/1953 | Ochsner | 40/547 |
| 2,992,587 | 7/1961 | Hicks, Jr. et al. | 350/96.25 |
| 3,082,560 | 3/1963 | Elvestrom | 40/453 |
| 3,104,324 | 9/1963 | Rabinow | 350/96.25 X |
| 3,131,496 | 5/1964 | Schropp | 40/444 |
| 3,184,872 | 5/1965 | Way | 40/443 |
| 3,278,738 | 10/1966 | Clark | 362/32 |
| 3,278,739 | 10/1966 | Royka et al. | 362/32 |
| 3,431,410 | 3/1969 | Dolan et al. | 40/433 |
| 3,530,615 | 9/1970 | Meyer | 446/91 |
| 3,532,874 | 10/1970 | Rosenast | 362/32 |
| 3,536,908 | 10/1970 | Oster | 40/431 |
| 3,568,357 | 3/1971 | Lebensfeld | 446/91 |
| 3,573,471 | 1/1967 | Kolb | 350/96.2 X |
| 3,715,822 | 2/1973 | Hansen, Jr. et al. | 40/130 K |
| 3,786,500 | 1/1974 | Fiorletta et al. | 340/380 |
| 3,805,048 | 4/1974 | Brennesholtz | 350/96.2 X |
| 3,821,732 | 6/1974 | Romney | 350/96.2 X |
| 3,836,911 | 9/1974 | Gibson et al. | 340/380 |
| 3,874,780 | 4/1975 | Love | 350/96.16 |
| 3,941,485 | 3/1976 | Madden | 350/96.2 X |
| 3,959,729 | 5/1976 | Marchetti | 455/157 |
| 3,962,702 | 6/1976 | Kriege | 350/96.1 X |
| 4,068,118 | 1/1978 | Carrington | 362/123 |
| 4,196,539 | 4/1980 | Speers | 40/547 X |
| 4,277,067 | 7/1981 | Gettleman | 273/271 |
| 4,279,089 | 7/1981 | Murakami | 350/96.25 X |
| 4,296,562 | 10/1981 | Sanborn | 40/438 |
| 4,310,974 | 1/1982 | Gdovin et al. | 350/96.24 X |
| 4,361,981 | 12/1982 | Reiling | 446/219 |
| 4,417,412 | 11/1983 | Sansom | 40/547 |
| 4,623,217 | 11/1986 | Hallen | 350/96.1 |
| 4,623,220 | 11/1986 | Grabbe et al. | 350/96.2 |
| 4,623,221 | 11/1986 | Marchegiano | 362/31 X |
| 4,631,848 | 12/1986 | Iwasa | 40/427 |
| 4,738,510 | 4/1988 | Sansom | 350/96.25 |

FOREIGN PATENT DOCUMENTS

| | | | |
|---|---|---|---|
| 3527914 | 2/1987 | Fed. Rep. of Germany | 350/96.2 |
| 57-19712 | 2/1982 | Japan | 360/96.24 |
| 58-14805 | 1/1983 | Japan | 350/96.25 |
| 63-192003 | 8/1988 | Japan | 350/96.24 |

OTHER PUBLICATIONS

"Fiber Optics-Optical Interior Hobby"-Brochure, 4 pages.

*Primary Examiner*—William L. Sikes
*Assistant Examiner*—John Ngo
*Attorney, Agent, or Firm*—Panitch Schwarze Jacobs & Nadel

[57] ABSTRACT

A lighted display device comprises a display panel having a plurality of lighting elements arranged in a pattern, one end of each of a plurality of light conducting fibers are removably received within lighting element locations on the display panel. The other ends of the fibers are received and retained within a support member. A light source is provided for illuminating the other end of the fibers, light from the light source being received by the other ends of the fibers and being conducted to the one ends of the fibers for illumination of the display panel. A movable disk is interposed between the light source and the other ends of the fibers for periodically altering the light received by the fibers to alter the light conducted to the display panel. A sleeve member engages each of the fibers for establishing a predetermined relationship between the portions of the fibers extending between the ends thereof to facilitate untangling of the fibers which become tangled and to prevent tangling of the fibers. In addition, a tip member is secured to the one end of each of the fibers for removably attaching the one end of each of the fibers to the display panel. The display panel is comprised of three layers, a generally rigid central matrix layer and inner and outer display layers, each of which includes an image thereon.

21 Claims, 5 Drawing Sheets

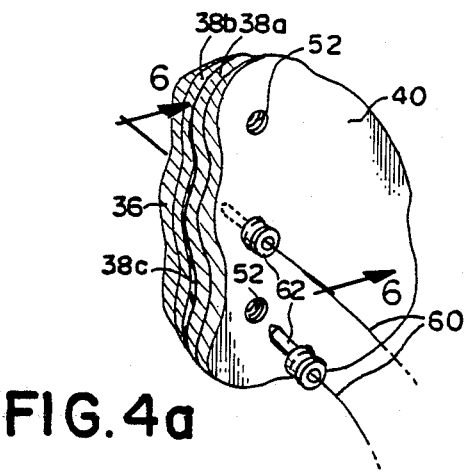
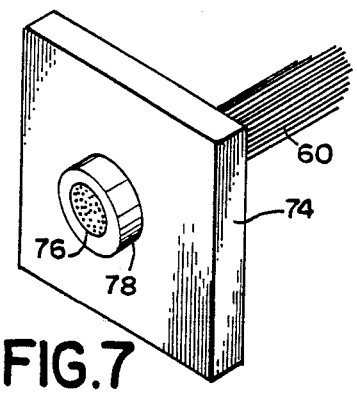
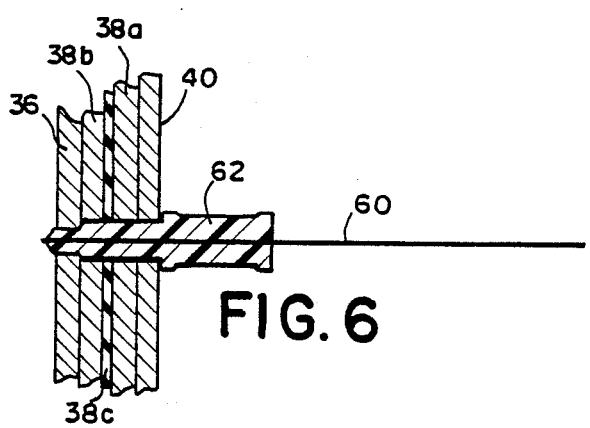
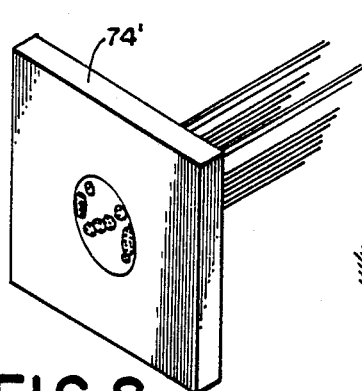
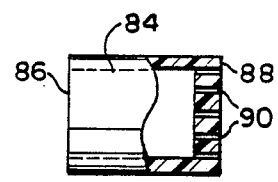
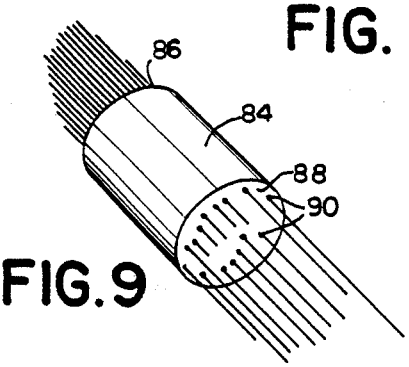
FIG.4a
FIG.7
FIG.6
FIG.8
FIG.9a
FIG.9

LIGHTED DISPLAY DEVICE

BACKGROUND OF THE INVENTION

The present invention relates to a display device and, more particularly, to a lighted display device which employs fiber optic means for conducting light from a light source to a display means and improvements relating thereto.

Various lighted display devices have been employed in the prior art. One such device is sold under the trademark "Light Brite" and is comprised of a housing having a generally flat display surface on one side. The display surface includes a plurality of generally circular openings, each of which are adapted to receive a generally cylindrical peg member or peg. A paper pattern is installed over the outer display surface to indicate the locations for the placement of the pegs to produce a design. The product includes pegs of several different colors to provide creativity. The housing includes a light source in the form of a low watt electric lightbulb. Once the pegs have been installed in the display surface openings to create the desired pattern, power is applied causing the light bulb to provide light to the interior of the housing. The peg members conduct light of the desired colors out of the housing to establish the lighted design.

While the above-described prior art system is effective, it suffers from certain drawbacks. One drawback is that the light source requires the user, generally a small child, to be exposed to standard house current, a potentially dangerous situation. Another drawback is that this prior art system generally permits only relatively unsophisticated designs or images to be displayed. In addition, the pegs tend to become lost or destroyed and the number of designs or images which may be lighted is relatively limited.

The present invention comprises a lighted display device of a similar type, but which in the preferred embodiment employs a low voltage, battery operated light source but which may be, if desired, operated utilizing a transformer and standard house current. In addition, the present invention comprises movable means interposed between the light source and the display for causing the color of the display to change in addition to creating a twinkling effect. The present invention employs state-of-the-art fiber optics for transmission of light from the light source to the display panel, thereby permitting the lighting of relatively sophisticated images. In addition, the present invention comprises other improvements on the prior art which will hereinafter become apparent.

SUMMARY OF THE INVENTION

Briefly stated, the present invention comprises a lighted display device having display means with a plurality of arranged lighting elements arranged in a pattern. A plurality of elongated light conducting fiber optic means are also included. One end of each of the fiber optic means is removably received in and extends from one of the lighting element locations on the display means. The other end of each of the fiber optic means is received and retained within support means. A light source is provided for illuminating the other ends of the fiber means, light from the light source being received by the other ends of the fiber optic means and being conducted to the one ends of the fiber optic means for illumination thereof. Movable means are interposed between the light source means and the other ends of the fiber optic means for periodically altering the light received by the other ends of the fiber optic means to alter the light conducted to the one ends of the fiber means. The invention further comprises several improvements, including means engaging each of the fiber optic means for establishing a predetermined relationship between the portions of the fiber optic means extending between the ends thereof to facilitate untangling of fiber optic means which become tangled and to prevent tangling of fiber means. Also provided are attaching means secured to the one end of each of the fiber optic means for removably attaching the one end of each of the fiber optic means to the display means at the lighting element locations.

BRIEF DESCRIPTION OF THE DRAWINGS

The foregoing summary, as well as the following detailed description, will be better understood when read in conjunction with the appended drawings. For the purpose of illustrating the invention, an embodiment which is presently preferred is shown in the drawings. It is understood, however, that this invention is not limited to the precise arrangement and instrumentalities shown. In the drawings:

FIG. 4a is a greatly enlarged view of a portion of FIG. 4;

FIG. 6 is a sectional view of a portion of the device taken along line 6—6 of FIG. 4a;

FIG. 7 is a perspective view of a portion of the device;

FIG. 8 is a perspective view similar to FIG. 7 of an alternate embodiment of a portion of the device;

FIG. 9 is a perspective view of the sleeve portion of the device of FIG. 1;

FIG. 9a is a sectional view of a portion of the device taken along line 9a—9a of FIG. 9;

DESCRIPTION OF PREFERRED EMBODIMENT

Figure 1:
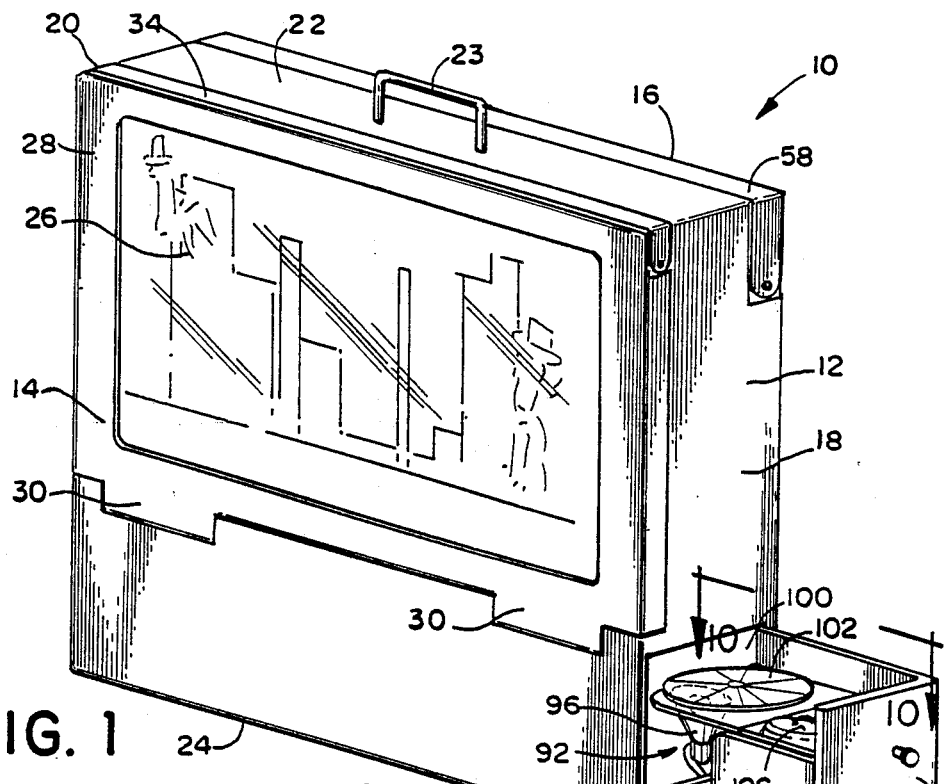
FIG. 1 is a front perspective view of a lighted display device in accordance with the present invention.
Figure 3:
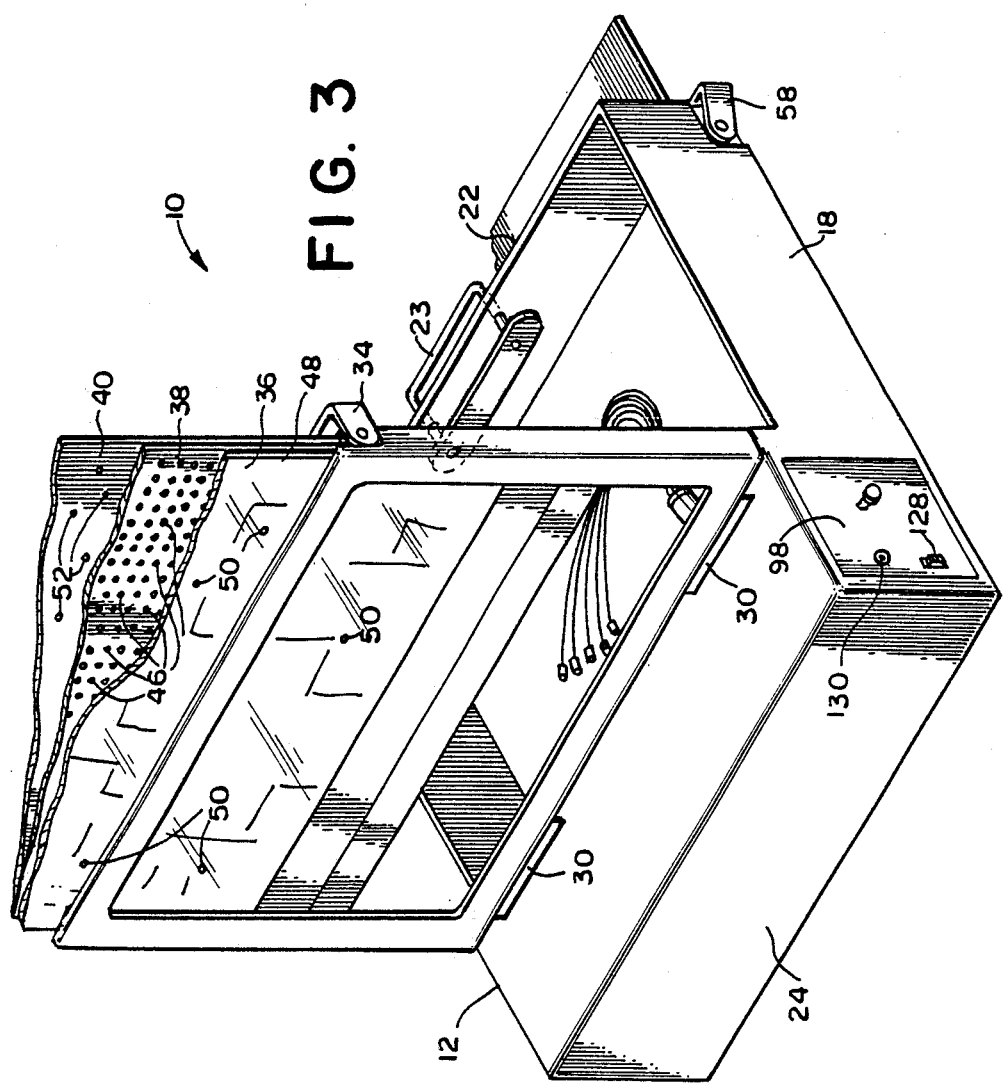
FIG. 3 is another front perspective view of the device shown in FIG. 1 in a slightly different position and partially broken away.
Figure 4:
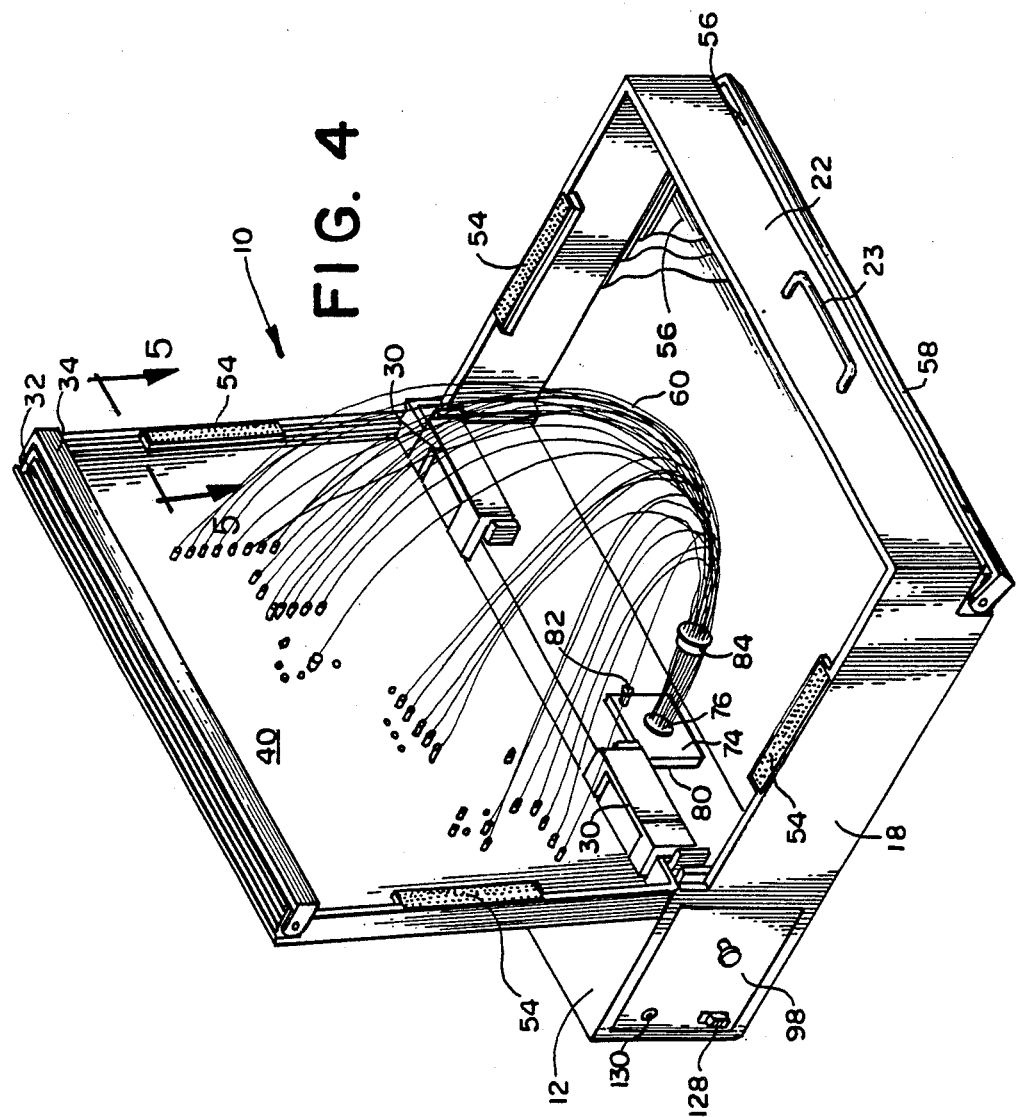
FIG. 4 is a rear perspective view of the device of FIG. 1 in the position shown in FIG. 3.

Referring to the drawings, wherein like numerals indicate like elements throughout, there is shown a lighted display device, generally 10, in accordance with the present invention. In the presently preferred embodiment, the display device 10 is contained within a generally box-like housing 12 preferably formed of a lightweight, high impact engineering plastic material, such as ABS plastic, polystyrene or polycarbonate. However, the housing 12 could be formed of any other type of plastic or any other suitable material. The housing 12 includes front and rear surfaces 14 and 16, respectively, side surfaces 18 and 20, respectively, and top and bottom end surfaces 22 and 24, respectively, when the housing is in an upright or display position, as shown in FIG. 1. The top surface 22 includes a retractable handle 23. As illustrated by FIGS. 3 and 4, the housing may be placed on its rear surface 14 to a working or preparation position. While the housing 12 is shown in the present embodiment as being generally square in front elevational view, the housing 12 could be any other suitable shape, for example, rectangular (not shown).

The front surface 14 of the housing includes a display means or display panel 26 having a plurality of lighting element locations arranged in a predetermined pattern for purposes which will hereinafter become apparent. In the presently preferred embodiment, the display panel 26 is generally rectangular in front view and is supported by a generally rectangular frame member 28 (best seen in FIG. 3), which comprises a portion of the upper front surface 14 of the housing 12. One end of the frame member 28, the lower end when viewing FIG. 3, is pivotally attached to the housing 12 by a hinge assembly 30. In this manner, the frame member 28 may be pivoted between a closed or transport position, as shown in FIG. 1, and an open or working position as shown in FIGS. 3 and 4.

Figure 2:
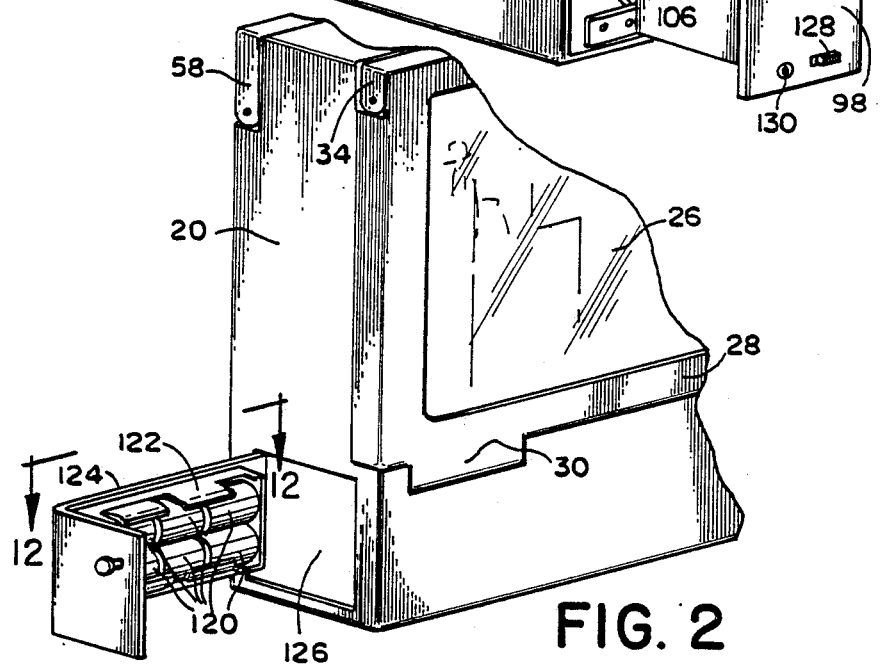
FIG. 2 is another front perspective view, partially broken away, of the device shown in FIG. 1.
Figure 5:
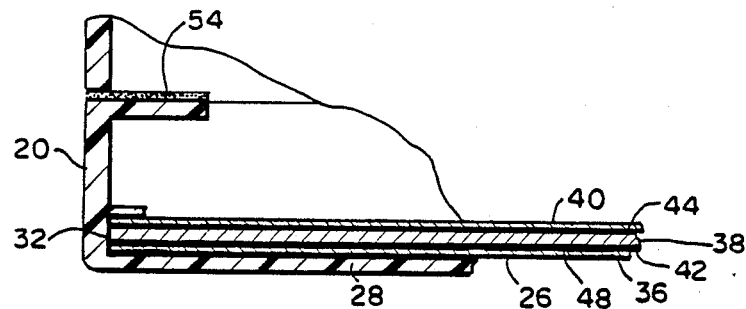
FIG. 5 is a sectional view of a portion of the device taken along line 5—5 of FIG. 4.
Figure 12:
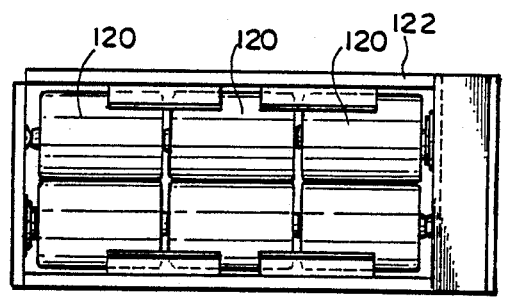
FIG. 12 is a sectional view of a portion of the device taken along line 12—12 of FIG. 2.

The frame member 28 includes a pair of generally parallel interior slots 32 for slidingly receiving the display panel 26, as best shown in FIGS. 3 and 5. The width of the display panel 26 is such that it fits within and slidingly engages the frame member slots 32 (see FIGS. 3, 4 and 5). The other or upper end of the frame member 28, distal from the hinge assembly 30, includes a cover member 34 pivotable between an open position, as shown in FIGS. 3 and 4 and a closed position, as shown in FIGS. 1 and 2. When in the open position (FIGS. 3 and 4), the cover member 34 is completely out of the pathway of frame member slots 32, thereby permitting the display panel 26 to be conveniently slid into or out of the frame member slots 32, as shown in FIG. 3. Once a display panel 26 has been installed within the frame member slots 32, the cover member 34 may be pivoted to the closed position (FIG. 1) to retain the display panel 26 within the frame member 28. While the frame member slots 32 and cover member 34 are presently preferred for retaining the display panel 26 within the frame member 28, it will be appreciated by those skilled in the art that any other means for removably retaining the display panel 26 may alternatively be employed. For example, a completely removable cover member or lid (not shown) or a slideable cover member (not shown) may be substituted for cover member 34. Similarly, a removable subframe (not shown) may be employed instead of the frame member slots 32.

As best shown in FIGS. 3 and 5, the display panel 26 is comprised of three separate layers, a central matrix layer 38 and an outer and inner display layer 36 and 40, respectively. The matrix layer is generally rigid and includes a front surface 42 and a back surface 44 with a plurality of generally evenly spaced openings 46 extending therethrough from the front surface 42 to the back surface 44. In the presently preferred embodiment, the openings 46 are generally circular and are all of a first, predetermined diameter. The openings 46 are generally equally spaced along a plurality of columns and rows, as shown, and extend over the entire length and width of the matrix layer 38. In the presently preferred embodiment, the matrix layer 38 includes about 616 openings 46 arranged in 22 rows and 28 columns. Preferably, the matrix layer 38 is formed of two sheets of an aluminum alloy 38a and 38b with a thin rubber mat 38c sandwiched between them and has a total thickness of approximately 11/64" to provide a stable, generally rigid panel. However, as will be appreciated by those skilled in the art, the matrix layer 38 could be formed of sheets of some other generally rigid material, such as plastic, wood, steel, or the like. The mat 38c could alternatively be formed of some other material, such as silicone, a flexible plastic or an adhesive. The matrix layer could also be formed in some alternative manner, such as a single rigid sheet with a backing mat. It will also be appreciated by those skilled in the art that the size, shape and number of openings in the matrix layer 38, as well as the spacing between the columns and/or rows of the openings 46, may vary from what is presently preferred.

The outer display layer 36 has a first surface which engages the front surface 42 of the matrix layer 38. The second or exposed surface 48 of the outer display layer 36 preferably has an image thereon for display. The image may be printed on the outer display layer 36, utilizing known printing techniques, or may be otherwise placed on the outer display layer 36. In the presently preferred embodiment, the outer display layer 36 is made of a heavy paper or cardboard material. Alternatively, plastic, cloth or any other suitable material may be employed.

The outer display layer 36 includes a plurality of openings 50 extending therethrough to establish the lighting element locations. As will hereinafter become apparent, the locations of the outer display layer openings 50 are in a predetermined pattern for the purpose of enhancing and/or highlighting the image on the outer display layer 36. In the presently preferred embodiment, the outer display layer openings 50 are generally circular and, when the outer layer 36 and the matrix layer 38 are properly engaged as shown, the openings 50 are in registry with matrix layer openings 46. However, for purposes which will hereinafter become apparent, the diameter of the outer display layer openings 50 is preferably smaller than the diameter of the matrix layer openings 46. It will be appreciated by those skilled in the art that the size and shape of the outer display layer openings 50 may vary. In addition, the number of outer display layer openings 50 may not precisely coincide with the number of matrix layer openings 46. The number and location of the outer display layer openings 50 may also vary, depending upon the particular image being displayed.

The inner display layer 40 has a first surface which engages the back surface 44 of the matrix layer 38 and a second, exposed surface which has an image thereon. For purposes which will hereinafter become apparent, the image which appears on the exposed surface of the inner display layer 40 is the exact mirror image of the image which appears on the exposed surface 48 of the outer display layer 36. The inner display layer 40 also includes a plurality of openings 52 extending therethrough. The number and locations of the inner display layer openings 52 correspond to the number and locations of the outer display layer openings 50. Of course, both the inner and outer display layer openings 50 and 52 are in registry with each other and with matrix layer openings 46. In the presently preferred embodiment, the inner layer openings 52 are generally circular and are larger in diameter than the matrix layer openings 46 which, in turn, are larger in diameter than the outer display layer openings 50. Thus, for purposes which will hereinafter become apparent, the size of the openings 52, 46, 50 become progressively smaller moving from the inner display layer 40 to the matrix layer 38 to the outer display layer 36. The openings 52, 46, 50 may also all be the same size or may vary in size and/or shape.

In the presently preferred embodiment, the display panel 26 is formed by placing an outer display layer 36 on one side of the matrix layer 38 and an inner display layer 40 on the other side of the matrix layer 38 and thereafter sliding the display panel 26 into the frame member slots 32 so that the frame member slots hold the three layers, 36, 38 and 40 together. The particular inner and outer display layers 40 and 36 may vary to change the image displayed. In addition, if desired, the inner and outer display layers 40 and 36 may be blank, permitting the user to develop his or her own image or design. It will be appreciated by those skilled in the art that the three layers may be brought together and the display panel 26 may also be formed utilizing a suitable attachment means, such as one or more clips or some form of adhesive. Alternatively, instead of reusing the matrix layer 38 with different inner and outer layers 40 and 36, each display panel may be permanently formed, either with three separate layers or with a single, unitary structure having the equivalent of the three separate layers.

As best seen in FIGS. 1 and 4, the hinge assembly 30 is of the slotted type, which permits the frame member 28 to move laterally a short distance toward the top end 22, or toward the bottom end 24. In the position shown in FIG. 1, the frame member 28 is in a locked, closed display or travel position, the lower end of the frame member 28 being retained by the hinge assembly 30 and the upper end of the frame member 28 being removably secured to the remainder of the housing 12, utilizing suitable fastener means, in the presently preferred embodiment, strips of hook and loop type fasteners 54 on the frame member and on each housing side (see FIG. 4). To change the position of the frame member 28, the frame member 28 is first pivoted slightly about the hinge assembly 30 to separate the hook and loop strips 54. Then, the frame member 28 is slid toward the top housing end 22 to release the hinge assembly 30. The frame member 28 may then be pivoted upwardly to the open or working position shown in FIGS. 3 and 4. The frame member 28 is then slid slightly downwardly so that the hinge assembly 30 locks the frame member 28 in the position shown. To move the frame member 28 to the closed position shown in FIG. 1, the foregoing process is performed in the reverse order. While the hinge assembly 30 as shown and described is presently preferred, it will be appreciated by those skilled in the art that some other type of hinge structure or device which permits the frame member 28 to pivot or rotate from a closed position to an open position in which the frame member 28 is supported in an upright orientation, as shown in FIG. 4, could alternatively be employed.

As best shown in FIGS. 3 and 4, the rear of the housing 24 includes a channel or storage area 56 extending generally across its entire length and width. The storage area 56 is employed for receiving and storing sets of outer and inner display layers 36 and 40. Each such set includes an outer display layer 36 having an image thereon and an inner display layer 40 having thereon a mirror image of the image on the corresponding outer display layer 36. Blank sets of inner and outer layers may also be provided. In this manner, a user may conveniently remove from the storage area 56 a set of inner and outer display layers 40 and 36 for changing the image displayed on the display panel 26. A cover member 58 is pivotably secured to the housing 12 proximate the intersection of the rear surface 16 and the top end 22. As can be seen from the drawings, the cover member 58 is pivotable between an open position shown in FIGS. 3 and 4 in which access is provided to the storage area 56 for insertion and removal of the display layer sets and a closed position as shown in FIG. 1. It will be appreciated by those skilled in the art that some other form of cover member may alternatively be employed or that some other means may be employed for retaining the display layer sets within the storage area 56.

The device 10 further includes a plurality of elongated light-conducting fiber optic means or optical fibers shown collectively and discussed individually as 60.

The optical fibers 60 are of a type generally well known in the art and commercially available from a variety of sources. Preferably, the optical fibers are about 0.030 to 0.040 inch in diameter. With a length that varies between 18 and 24 in. In the presently preferred embodiment, about 150 optical fibers are provided in three bundles having a length of 18 inches, 21 inches and 24 inches, respectively. However, the optical fibers could be of different lengths or could all be of the same length if desired. The diameter of the optical fibers could also vary in size if desired and optical fibers of differing diameters could be employed in a single device 10. In addition, while 150 optical fibers are presently preferred, a greater or lesser number of such optical fibers could be employed. It should be appreciated by those skilled in the art that, when displaying a particular image or design, less than all of the available optical fibers may be used. Any optical fibers which are not used may remain loose within the interior of the housing 12 as shown in FIG. 3.

As best shown in FIGS. 4 and 4a, one end of each of the fibers 60 is removably received within the openings 52, 46, 50, extending trough the display panel 26 so that the one end of the fiber extends from one of the lighting element locations to provide a point of light on the display panel 26. Attaching means are secured to the one end of each of the fibers 60 for removably attaching the one end of each of the fibers 60 to the display panel 26 in a manner which will hereinafter be described.

In the presently preferred embodiment, the attaching means comprises a tip member 62. As best shown in FIGS. 4a and 6, the tip member 62 is generally cylindrical and includes a generally axially extending circular opening 64 extending through the axial center along its entire axial length. The tip member opening 64 is preferably slightly smaller than the outer diameter of the optical fibers 60 so that when an optical fiber is installed within the tip member opening 64, as shown, the tip member 62 places a slight inward pressure upon the optical fiber 60 to hold the tip member 62 in place on the fiber. Preferably, the pressure applied by the tip member 62 to the fiber does not damage the fiber and permits the fiber to rotate or move axially with respect to the tip member 62 upon the application of a small force. However, in the absence of such a force, the tip member 62 remains in a fixed position with respect to the optical fiber 60. If desired, the tip member opening 64 could be the same size as or slightly larger than the outer diameter of the optical fiber 60 to permit the tip member 64 to move more freely with respect to the optical fiber 60. Preferably, once the optical fiber is inserted within the tip member opening 64, the distal end of the fiber 66 is slightly flailed or flattened to a diameter greater than the diameter of the tip member opening 64 to retain the tip member 62 on the optical fiber 60. If desired, more than one optical fiber 60 may be inserted into a tip member opening 64, either by employing small diameter optical fibers and/or enlarging the tip member opening 64.

As best seen in FIG. 6, the tip member 62 is generally cylindrical, with three separate sections 68, 70 and 72, each with a differing outer diameter. The diameter as well as the length of the smallest tip member section 68 generally correspond to the diameter and length of the openings 50 on the outer display layer 36 of the display panel 26. Similarly, the diameter and length of the middle tip member section 70 generally correspond to the diameter and length of the opening 46 in the matrix layer 38. The diameter of the larger tip member section 72 corresponds to the diameter of the openings 52 on the inner display layer 40. In this manner, when the tip member 62 is installed within the display panel openings 52, 46 and 50, the tip member 62, and thus the fiber 60, are retained therein. Preferably, the length of the larger tip member section 72 is greater than the length of the inner display layer 40 so that the tip member 62 when installed extends beyond the inner display layer 40 and thereby serves as a convenient gripping means or handle to facilitate insertion and removal of the fiber 60 from openings in the rear of the display panel 26. It will be appreciated by those skilled in the art that the structure of the tip member 62 may vary from the tip member shown and described. For example, the tip member may be square in cross section. Alternatively, the optical fibers 60 may be installed within the various display panel openings without utilizing tip members. It may also be desirable to utilize tip members of varying sizes, dimensions or colors for use on differing locations along the display panel 26. Other variations will, of course, be readily apparent to those skilled in the art.

The device 10 further includes support means receiving the other end of the optical fibers 60 and retaining the optical fibers 60 in a predetermined arrangement. As best shown in FIGS. 4 and 7, in the presently preferred embodiment, the support means includes a generally flat mounting plate 74 having a generally circular central opening 76 for receiving and retaining the other ends of the optical fibers 60. Preferably, the optical fibers 60 are retained within the opening 76 with a suitable adhesive, potting compound or the like.

The mounting plate 74 further includes a generally outwardly extending flange member 78. The mounting plate 74 is installed within a suitably sized opening 80 (see FIG. 4) within the housing 12 so that at least the flange member 78 extends into the opening. A suitable securing means, in the present embodiment, a thumb screw 82, is employed for releasably retaining the mounting plate 74 within the housing opening 80. In this manner, the mounting plate 74 and all of the optical fibers 60 may be completely removed from the housing 12 for repair and/or replacement, if necessary. Alternatively, the mounting plate 74 could be flat (i.e., no flange member 78 as shown in FIG. 8) and may be installed into a bracket (not shown) parallel with the housing opening 80 and may be held in place by a clip or spring member (not shown). The optical fibers may be installed within the mounting plate 74 in a random manner as shown in FIG. 7, or in a predetermined pattern (shown in FIG. 8) to permit the display of special effects.

The lighted display device 10 also includes means engaging each of the fiber optic means or optical fibers 60 for establishing a predetermined relationship between the optical fibers, particularly the portions of the optical fibers 60 extending between the ends thereof. In the presently preferred embodiment, as shown in FIGS. 4 and 9, the means for engaging each of the fibers comprises a sleeve member 84 having a first end 86 and a second end 88. The sleeve member surrounds at least a portion of the optical fibers 60. In the presently preferred embodiment, a single sleeve member 84 surrounds all of the optical fibers 60. Alternatively, a plurality of sleeve members (not shown) could each surround generally equal portions of the optical fibers 60. The sleeve member 84 includes a plurality of openings 90 on at least one end 88. The optical fibers 60 extend through the openings 90. In the presently preferred embodiment, the number of openings 90 extending through the sleeve member end 88 exactly corresponds to the number of optical fibers 60 so that each of the optical fibers 60 extends through a different sleeve member opening 90. However, the size of the sleeve member openings 90 could vary so that a plurality of optical fibers, for example, five or 50 optical fibers, could extend through each such opening. In addition, more than one sleeve member 84 could be employed with each such sleeve member engaging a proportional portion of the optical fibers 60. Preferably, the diameter of the sleeve member openings 90 is slightly greater than the outer diameter of the optical fibers 60 so that the sleeve member 84 may move with respect to the optical fibers 60. Preferably, the length of the sleeve member 84 is small in comparison to the overall length of the optical fibers 60. In this manner, the sleeve member 84 may be moved or slid along the optical fibers toward the tip members 62 to prevent the optical fibers from becoming tangled and to untangle any optical fibers 60 which have become tangled. The sleeve member 84 is preferably made of a lightweight, preferably plastic, material. However, the sleeve member 84 could be formed of any other suitable material, for example, aluminum.

Figure 11:
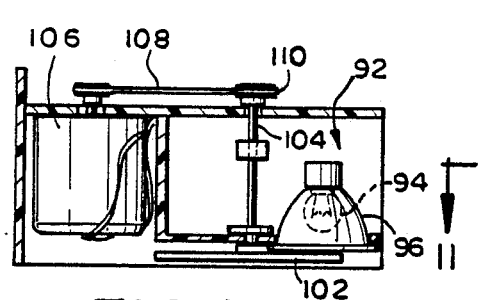
FIG. 11 is a sectional view taken along line 11—11 of FIG. 10.
Figure 10:
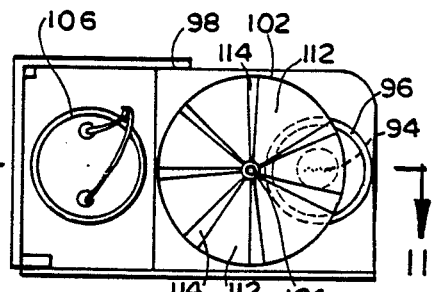
FIG. 10 is a sectional view of a portion of the device taken along line 10—10 of FIG. 1.

The device 10 further includes light source means or a light source 92 for illuminating the other ends of the optical fibers. In this manner, light from the light source 92 is received by the other ends of the optical fibers 60 and is conducted to the one ends of the optical fibers for illumination of the display panel 26. In the presently preferred embodiment, as best shown in FIGS. 1, 10 and 11, the light source 92 is comprised of a light bulb 94 and reflector 96 arranged in a manner well known in the art. Preferably, the light source 92 is contained within a subhousing 98. The subhousing 98 is in the form of a drawer-like structure that is slideable into a suitably sized opening 100 in the bottom end 24 of the housing 12, as shown in FIG. 1. When the subhousing 98 is properly installed within the housing opening 100, the light source 92 is preferably directly aligned with the flange member 78 when the mounting plate 74 is properly installed within housing opening 80. In this manner, light from the light source 92 directly illuminates the other ends of the optical fibers 60. Removal and replacement of the light bulb 94 is conveniently accomplished by removing the subhousing 98 from the housing opening 100 and removing and replacing the light bulb 94 in the usual manner. Power for the light bulb is provided through electrical contacts (not shown) similar to the manner in which power is provided to the bulb of a flash light.

Movable means are interposed between the light source 92 and the other end of the optical fibers 60 for periodically altering the light being received by the optical fibers 60 to thereby alter the light conducted to the other ends of the optical fibers 60 on the display panel 26. In the presently preferred embodiment, the movable means is comprised of a rotatable, generally translucent, generally circular disk member 102. The disk member 102, which is best seen in FIGS. 1 and 10, is removably secured to one end of a generally cylindrical drive shaft 104, which is rotatably supported within the subhousing 98. The other end of the drive shaft 104 is drivingly connected to a drive means for rotating the disk member 102 at a predetermined speed to periodically alter the color of the light received by the optical fibers 60. In the presently preferred embodiment, the drive means comprises an electrically powered motor 106 and a suitable drive belt 108. The drive belt 108 engages the output shaft of the motor 106, as well as a suitable pulley member 110 on the drive shaft 104. Preferably, the motor 106 is a 4½ volt D.C. motor which preferably operates at a speed of approximately three revolutions per minute and the drive belt/pulley member are in a 1:1 ratio so that the drive shaft 104 also rotates at approximately three revolutions per minute. The disk member 102 is removably attached to the drive shaft 104 utilizing a set screw (not shown) or any other suitable attachment means well known to those skilled in the art. It will be appreciated by those skilled in the art that the speed of rotation of the motor and/or of the drive shaft may vary by varying the pulley/drive arrangement, by varying the motor speed, or in any other manner known to those skilled in the art. It will also be appreciate that the disk member 102 may be secured directly to the output shaft of the motor 106 or that a gear train (not shown) or other type of drive means could be employed. Variations in the speed of rotation of the disk member 102 can be utilized for creating special effects on the display panel 26.

The disk member 102 shown in FIG. 10 includes a plurality of color segments 112, each of a different color, the color segments being separated from each other by a plurality of clear or transparent segments 114. In the presently preferred embodiment, both the color segments 112 and the clear segments 114 are pie-shaped, the color segments 112 each including a substantially greater arcuate portion of the disk member 102 than each of the clear segments 114. In this manner, as the disk member 102 rotates, the various color segments 112 cause colored light to pass through the optical fibers 60 to the displaY panel 26. As a smaller, clear segment 114 passes between the light source 92 and the optical fibers 60, a small interval of clear or white light is transmitted along the optical fibers to provide the appearance of a twinkling light. It will be appreciated by those skilled in the art that the size, shape and particular color arrangement shown for the disk member 102 may be varied. For example, each of the color segments 112 may include one or more small, clear openings within the middle thereof, to again provide a twinkling effect. In addition, the color segments 112 may be smaller in size to provide for a more rapid change in color. Likewise, the color segments 112 may be arranged in some other shape, such as a swirl shape or an amorphous shape to further change the light pattern appearing at the display panel 26.

Electrical power for the lighted display device 10 is preferably provided by six D cell batteries 120 installed in the usual manner within a battery casing 122 as shown in FIG. 2. In the presently preferred embodiment, the battery casing 122 is positioned within a subhousing 124, which may be installed within a suitable sized opening 126 within the bottom of housing 12. Of course, the batteries 120 may be replaced by a suitable transformer (not shown), which may be plugged into a suitable receptacle 128, as shown in FIG. 1, for powering the device 10 utilizing standard 110 volts electrical power. A switch member or switch 130, as shown in FIG. 1, is included for controlling the application of power from the batteries 120 (or the transformer) to both the light source 92 and the motor 106 along suitable wires or other such conductors (not shown) within the housing 12.

In operation of the device 10, the power is initially turned off and the device is placed on its rear surface 16, as shown in FIGS. 3 and 4. The frame member 28 is pivoted to the upward or working position, as shown in FIG. 4. The user then selects the particular image to be displayed, either from the available sets of inner and outer display layers 40, 36 contained within the storage area 56 or from sets otherwise available. Alternatively, the user may decide to create a design or image utilizing blank inner and outer display layers (not shown). Once the desired inner and outer display layers 40 and 36 have been selected, they are appropriately combined with the matrix layer 38 and are installed within the frame members slots 32, as previously described and the cover member 34 is pivoted to the closed position as shown in FIGS. 1 and 2.

Once the image to be displayed has been selected, the optical fibers 60 are installed by inserting the tip members 62 into the display panel openings, as previously described and shown in FIGS. 4 and 4a. In the presently preferred embodiment, the optical fibers 60 vary in length. Accordingly, optical fibers having a shorter length are installed in the display panel openings proximate the lower end of the display panel 26 and optical fibers having a longer length are installed in the openings proximate the upper end of the display panel 26. Once the tip members have been installed in all of the available display panel openings, the preparation phase has been completed. It will be appreciated by those skilled in the art that the number of optical fibers employed in lighting the display panel may vary, depending upon the particular image. With some images, all of the optical fibers 60 will be employed. In the case of other images, there will be additional optical fibers which will not be utilized. The unused optical fibers can remain loose within the interior of the housing 12 as shown in FIG. 3.

When all of the necessary optical fibers have been installed within the display panel 26, the frame member 28 is again moved to its down or closed position, in the manner described above. The device 10 is then stood up to the position shown in FIG. 1 and the switch 130 is turned to the "on" position, causing the light bulb 92 to be illuminated and causing the disk member 102 to be turned by the motor 106. Light from the light source 92 passes through the disk member 102 and into the optical fibers 60 for transmission to the display panel 26. As previously indicated, the specific structural arrangement of the color segments 112 and the clear segments 114 along with the size and shape of the segments 112 and 114 and the speed of rotation of the disk member 102 determines the changes in the light pattern and the "twinkling" effect observable at the display panel 26.

The image being displayed can be conveniently changed by turning off the power at the power switch 130, placing the device 10 in the position shown in FIG. 4 and removing all of the tip members 62 from the display panel openings. The display panel 26 may then be changed and the tip members 62 reinstalled within the display panel openings with respect to the new image to be displayed in the manner described above.

From the foregoing description, it can be seen that the present invention comprises a lighted display device which employs light conducting fiber optic means for conducting light from a light source to a display means. It will be recognized by those skilled in the art that changes may be made to the above-described embodiment of the invention without departing from the broad inventive concept thereof. It is understood, therefore, that this invention is not limited to the particular embodiment disclosed, but is intended to cover any modifications which are within the scope and spirit of the invention as defined by the appended claims.

I claim:

1. In a lighted display device comprising:
   display means having a plurality of lighting elements arranged in a pattern;
   a plurality of elongated light conducting fiber optic means, one end of each of the fiber optic means being removably received in, and extending from, one of the lighting element locations on the display means;
   support means receiving the other ends of each of the fiber optic means and retaining the other ends of the fiber optic means;
   light source means for illuminating the other ends of the fiber optic means, light from the light source means being received by the other ends of the fiber optic means and being conducted to the one ends of the fiber optic means for illumination thereof; and
   movable means interposed between the light source means and the other ends of the fiber optic means for periodically altering the light received by the other ends of the fiber optic means to alter the light conducted to the one ends of the fiber optic means;
   wherein the improvement comprises:
   means engaging each of the fiber optic means for establishing a predetermined relationship between the portions of the fiber optic means extending between the ends thereof to facilitate untangling of fiber optic means which become tangled and to prevent tangling of fiber optic means.

2. The device as recited in claim 1 wherein the means engaging each of the fiber optic means comprises a sleeve member having a first and a second end, the sleeve member surrounding at least a portion of the fiber optic means, the sleeve member including a plurality of openings on at least one end, the fiber optic means extending through said openings.

3. The device as recited in claim 2 wherein the number of sleeve member openings corresponds to the number of fiber optic means so that each of the fiber optic means extends through a different sleeve member opening.

4. The device as recited in claim 2 wherein the length of the sleeve member is small in comparison to the length of the fiber optic means and wherein the sleeve member is movable relative to the fiber optic means to facilitate untangling of the fiber optic means.

5. In a lighted display device comprising:
   display means having a plurality of lighting elements arranged in a pattern;
   a plurality of elongated light conducting fiber optic means, one end of each of the fiber optic means being removably received in, and extending from, one of the lighting element locations on the display means, the lighting element locations comprising openings extending through the display means;
   support means receiving the other ends of each of the fiber optic means and retaining the other ends of the fiber optic means;
   light source means for illuminating the other ends of the fiber optic means, light from the light source means being received by the other ends of the fiber optic means and being conducted to the one ends of the fiber optic means for illumination thereof; and
   movable means interposed between the light source means and the other ends of the fiber optic means for periodically altering the light received by the other ends of the fiber optic means to alter the light conducted to the one ends of the fiber optic means;
   wherein the improvement comprises:
   attaching means secured to the one end of each of the fiber optic means for removably attaching the one end of each of the fiber optic means to the display means at the lighting element locations, the attaching means comprising a plurality of tip members, each tip member for receiving the one end of a fiber optic means, the tip member being complementary to the lighting element location openings for insertion and removal by hand into the lighting element location openings so that when a tip member is inserted into an opening, the tip member is retained therein and the fiber optic means within the tip member is precisely oriented within the opening.

6. The device as recited in claim 5 wherein the lighting element location openings are generally circular and the tip members are generally cylindrical, with at least a portion of the outer diameter of the tip members being slightly greater than the diameter of at least a corresponding portion of the lighting element location openings to provide a snug fit when the tip members are inserted into said lighting element location openings.

7. The device as recited in claim 6 wherein each of the tip members includes an opening extending axially therethrough, the tip member openings being complementary to the fiber optic means and being sized so that a fiber optic means inserted into a tip member opening is retained therein.

8. In a lighted display device comprising:
   display means having a pluralitY of lighting elements arranged in a pattern;
   a plurality of elongated light conducting fiber optic means, one end of each of the fiber optic means being removably received in, and extending from, one of the lighting element locations on the display means;
   support means receiving the other ends of each of the fiber optic means and retaining the other ends of the fiber optic means;
   light source means for illuminating the other ends of the fiber optic means, light from the light source means being received by the other ends of the fiber optic means and being conducted to the one ends of the fiber optic means for illumination thereof; and movable means interposed between the light source means and the other ends of the fiber optic means for periodically altering the light received by the other ends of the fiber optic means to alter the light conducted to the one ends of the fiber optic means;

wherein the improvement is:

the display means includes a generally flat display panel having three layers, a generally rigid, central matrix layer having a front surface and a back surface and a plurality of spaced openings extending therethrough from the front surface to the back surface, an outer display layer having a first surface which engages the front surface of the matrix layer and a second surface having an image thereon for display, the outer display layer including a plurality of openings extending therethrough to establish the lighting element locations, the outer display layer openings being in registry with matrix layer openings, and an inner display layer having a first surface which engages the back surface of the matrix layer and a second surface having an image thereon, the inner display layer image being the mirror image of the outer display layer image, the inner display layer including a plurality of openings extending therethrough, the inner display layer openings corresponding to, and being in registry with, the outer display layer openings.

9. The device as recited in claim 8 wherein the inner and outer display layers are removably secured to the matrix layer to facilitate removal and replacement of the inner and outer display layers with other inner and outer display layers having differing images thereon.

10. The device as recited in claim 8 wherein the inner display layer openings are larger than the matrix layer openings and the matrix layer openings are larger than the outer display layer openings.

11. The device as recited in claim 8 wherein the matrix layer is formed of a pair of sheets of an aluminum alloy with a pad therebetween.

12. The device as recited in claim 8 wherein the inner and outer display layers are formed of paper.

13. The device as recited in claim 8 wherein the display means further comprises a frame member for removably receiving the display panel and for securing together the three layers thereof.

14. In a lighted display device comprising:

display means having a plurality of lighting elements arranged in a pattern;

a plurality of elongated light conducting fiber optic means, one end of each of the fiber optic means being removably received in, and extending from, one of the lighting element locations on the display means;

support means receiving the other ends of each of the fiber optic means and retaining the other ends of the fiber optic means;

light source means for illuminating the other ends of the fiber optic means, light from the light source means being received by the other ends of the fiber optic means and being conducted to the one ends of the fiber optic means for illumination thereof; and movable means interposed between the light source means and the other ends of the fiber optic means for periodically altering the light received by the other ends of the fiber optic means to alter the light conducted to the one ends of the fiber optic means;

wherein the improvement comprises:

the movable means comprises a rotatable, generally translucent, generally circular disk member interposed between the light source means and the other end of the fiber optic means, the disk member including a plurality of colored segments and a plurality of clear segments, and drive means drivingly connected to the disk member for rotating the disk member at a predetermined speed for periodically altering the color of the light received by the other ends of the fiber optic means.

15. The device as recited in claim 14 wherein the disk member is mounted upon a drive shaft and wherein the drive means comprises an electrically powered motor connected to the drive shaft by a belt.

16. The device as recited in claim 14 wherein the size of the segments of the disk member varies.

17. The device as recited in claim 14 wherein each of the color segments is greater in area than each of the clear segments.

18. The device as recited in claim 14 wherein the clear segments comprise small areas within each of the colored segments.

19. The device as recited in claims 14 wherein the clear segments are positioned between adjoining color segments.

20. In a lighted display device comprising:

display means having a plurality of lighting elements arranged in a pattern;

a plurality of elongated light conducting fiber optic means, one end of each of the fiber optic means being removably received in, and extending from, one of the lighting element locations on the display means;

support means receiving the other ends of each of the fiber optic means and retaining the other ends of the fiber optic means;

light sources means for illuminating the other ends of the fiber optic means, light from the light source means being received by the other ends of the fiber optic means and being conducted to the one ends of the fiber optic means for illumination thereof; and movable means interposed between the light source means and the other ends of the fiber optic means for periodically altering the light received by the other ends of the fiber optic means to alter the light conducted to the one ends of the fiber optic means;

where the improvement comprises:

the support means includes a mounting plate which is generally square in cross section for receiving and retaining the other ends of the fiber optic means and means for removably retaining the mounting plate for receiving light from the light source means, the retaining means comprising a surface which includes a generally square opening sized to receive the mounting plate and means for removably securing the mounting plate within said opening.

21. The device as recited in claim 20 wherein the securing means comprises a thumb screw.

* * * * *